United States Patent [19]

Taylor

[11] Patent Number: 5,390,531
[45] Date of Patent: Feb. 21, 1995

[54] LEAK TESTING

[75] Inventor: Thomas C. Taylor, Falkirk, Great Britain

[73] Assignee: W. L. Gore & Associates, Inc., Newark, Del.

[21] Appl. No.: 232,077

[22] PCT Filed: Nov. 9, 1992

[86] PCT No.: PCT/GB92/02060

§ 371 Date: Mar. 26, 1994

§ 102(e) Date: Mar. 26, 1994

[87] PCT Pub. No.: WO93/09418

PCT Pub. Date: May 13, 1993

[30] Foreign Application Priority Data

Nov. 9, 1991 [GB] United Kingdom ............... 9123880

[51] Int. Cl.⁶ ................. G01M 3/04; G01M 3/20; B32B 3/26
[52] U.S. Cl. .......................... 73/40; 73/37; 73/40.7; 428/198
[58] Field of Search ............... 73/37, 40, 40.7

[56] References Cited

U.S. PATENT DOCUMENTS

| 2,126,434 | 8/1938 | Vosbury . | |
| 2,800,788 | 7/1957 | Smith | 73/40 |
| 3,315,519 | 4/1967 | Ferguson | 73/40 |
| 4,055,984 | 11/1977 | Marx | 73/40.7 |
| 4,612,798 | 9/1986 | Roberts | 73/40.7 |
| 4,692,369 | 9/1987 | Nomi | 428/198 |
| 4,885,930 | 12/1989 | Werner et al. . | |
| 4,969,350 | 11/1990 | Fogal, Sr. | 73/40.7 |
| 5,327,775 | 7/1994 | Epshetsky | 73/40 |

FOREIGN PATENT DOCUMENTS

| 2111824 | 12/1982 | United Kingdom . |
| 2207515 | 2/1989 | United Kingdom . |
| 2248486 | 9/1991 | United Kingdom . |

Primary Examiner—Thomas P. Noland
Assistant Examiner—J. David Wiggins
Attorney, Agent, or Firm—Gary A. Samuels

[57] ABSTRACT

An apparatus for leak testing a garment, such as an over-water flying suit formed of a waterproof material, comprises a closure plug (4) for closing the neck of the garment and clamps (36, 38, 40, 42) for holding it in place. Clamps (26, 28) close other openings in the garment to allow it to be inflated, usually turned inside out to simulate exposure to water immersion. A mixture of water and compressed air is sprayed into the inflated garment via nozzles (18). The inflated garment is then inspected visually for leaks, and may be raised to an upright position to facilitate inspection. A restraining cage (70) can be used to prevent damage by stretching during inflation.

7 Claims, 4 Drawing Sheets

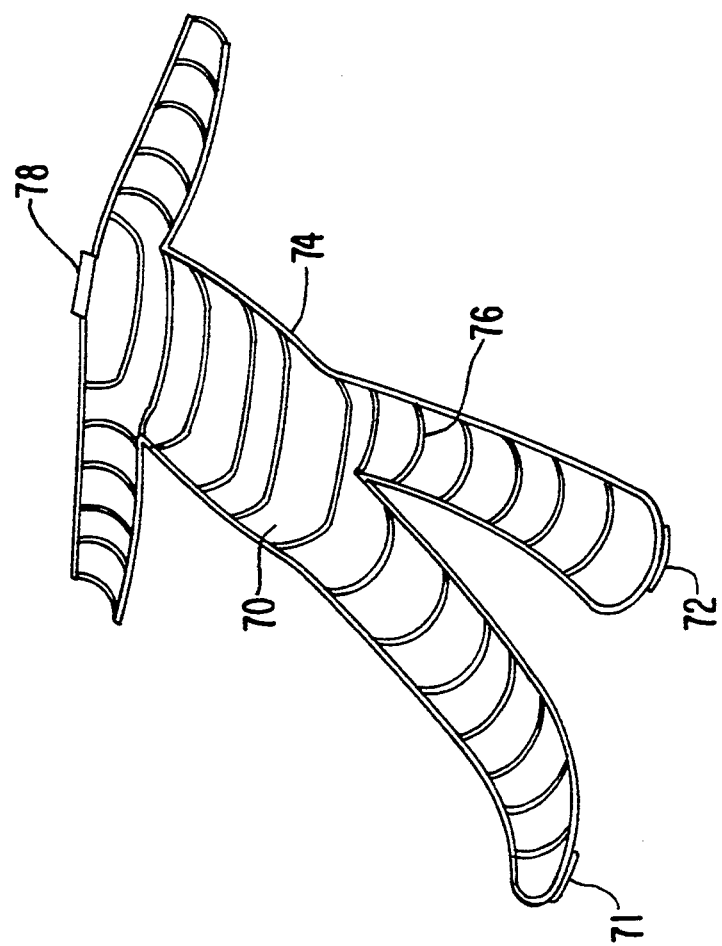
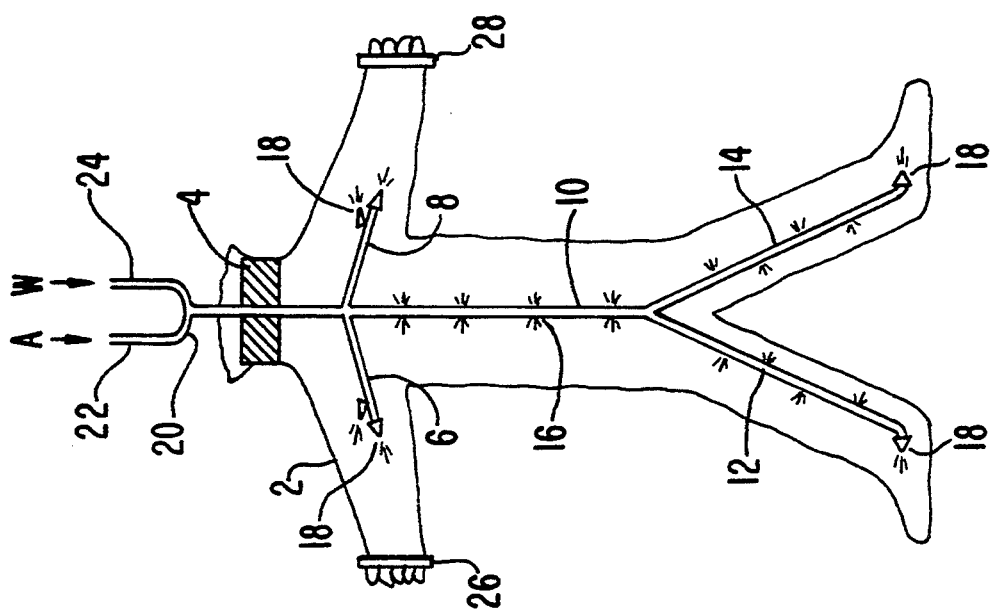

LEAK TESTING

FIELD OF THE INVENTION

The present invention relates to an apparatus and method for leak testing a waterproof garment with respect to ingress of liquid water.

BACKGROUND

Waterproof garments, such as oil skins, have been known for many years. Whilst these protect the wearer against water penetration, they are uncomfortable to wear since they are unable to allow perspiration from the body to escape, so that the inside of the garment becomes clammy. More recently, fabrics have become available which resist the ingress of liquid water, yet at the same time allow water vapour to pass through. One such fabric is available under the trademark GORE-TEX and comprises an expanded porous Polytetrafluoroethylene (PTFE) membrane. Typically, the fabric comprises a porous expanded PTFE membrane laminated to a woven fabric (typically nylon or polyester) which protects the outside of the membrane. GORE-TEX fabric is generally a three-layer construction which further includes an open knitted material laminated to the inside of the porous expanded PTFE membrane, which protects the membrane and improves the feel of the fabric. The fabric is used to produce waterproof breathable garments in substantially conventional manner. However, in order to prevent water penetration at the seams of the garment, it is normal to apply a heat bonded tape over the inside of the seams. The heated tape is applied under pressure to the seam, such that the melted adhesive penetrates the inner knitted layer of the fabric and bonds to the PTFE membrane itself, thereby sealing the seam against water penetration.

Waterproof breathable garments find application in a variety of fields, including industrial clothing, leisure clothing and military clothing. A wide variety of garments may be produced, including socks, mitts, jackets, suits, trousers, overalls, bib-and-brace overalls etc. However, one particularly important application is in the construction of aviation survival suits termed Over Water Flying Suits (OWFS). These suits are worn by pilots and passengers undertaking over water flights, such as Air Force Personnel and Crews servicing offshore installations such as oil rigs.

It is a requirement that over water flying suits be washed and tested for water tightness every week or two during use. The OWFS must be capable of keeping dry a person who has accidentally come down in the sea for a period of at least half an hour. This is important in cold Northern seas in order to prevent hypothermia prior to rescue. One test standard prescribes a maximum of 100 grams of water ingress over a 20 minute period. Since the flight suits become chaffed, worn or torn in use, or the taped seams fail, regular testing is necessary.

One test method is to turn the flight suit inside out and fill it with water, and observe any signs of leakage. This is a cumbersome and time consuming method, which moreover may damage the suits due to the weight of water inside.

At present, flying suits are conventionally tested by inflating the suit with air, applying soapy water to the outside of the suit and looking for any tell-tale bubbles. Any leaks are marked and then sealed with tape. This method is also time consuming and therefore costly. Moreover, the method detects air leaks rather than water leaks. Thus, there may be pin holes which allow air through but which would not allow liquid water through and therefore would not jeopardise the waterproofness of the fabric. In other words, this test method results in more repair work being carried out than is necessary. Also the application of unnecessary sealing tape is undesirable since it tends to increase the rigidity of the flying suits and lessens the breathability, so that they become more uncomfortable to wear; and areas adjacent pieces of repair tape tend to be more liable to failure through chaffing.

It is an object of the present invention to provide a test procedure which mitigates these problems.

SUMMARY OF THE INVENTION

One aspect of the present invention provides an apparatus for leak-testing a garment for ingress of liquid water, which comprises;

closure means for closing the openings in the garment such as to allow the garment to be inflated;

spray means for spraying the inner surface of the closed garment with liquid water; and pressurising means for inflating the closed garment by gas pressure and for forcing the sprayed liquid water through any leaks in the garment.

The invention also provides a corresponding method of testing.

Preferred Embodiments

Support means may also be provided comprising a frame or hanger on which the garment can be hung in its inside-out state; or may be formed by the closure means or pipes for supplying gas or water. Turning the garment inside out reproduces the normal direction of water penetration, since in the test, water is sprayed onto the inner surface of the garment, which is the outside of the garment when worn. It also enables any leaks to be marked directly on the inside of the garment, thereby facilitating application of repair patches.

The closure means generally include a plug through which the spray means and pressurising means pass, together with clamps for sealing other openings in the garment, such as armholes, footholes, and around the waist in the case of a garment intended to cover only part of the body. Waterproof garments such as flight suits are generally provided with a waterproof zip, which is closed prior to testing. The closure means should be effective to allow the garment to be inflated to the prescribed test pressure. However, any leakage which occurs through the clamp means can be readily identified and disregarded.

The spray means are effective for spraying water over substantially all the inner surface of the closed garment. The spray means may be in the form of pipes provided with holes at regular intervals along their length, and which extend into the body, arms and legs of the garment. Alternatively or additionally, a series of spray jets or nozzles may be used to ensure that water is distributed to the inside of all parts of the garment. It may be more convenient to use jets to spray into the ends of the arms and legs of the garment, since this minimises the size of the spray means and facilitates mounting of the garment over the spray means ant the support means. It is possible that the spray means might act as the support means also. Generally, it is only necessary to spray sufficient water to thoroughly saturate the inner surface of the garment. Typically, 200 to 900 ml of water might be required to test a flight suit.

The apparatus may be arranged to allow the garment mounted therein to be tilted from a horizontal position (where loading is simplest) to an upright position which assists even water distribution and allows both sides of the garment to be inspected.

The pressurising means are for inflating the closed garment, and generally comprise a source of compressed air, suitable for pressurising the garment up to the test pressure, typically 2-3 lbs per square inch (0.14-0.21 kg/sq cm). The spray means and pressurising means are generally operated independently. The spray means may be operated first so as to thoroughly wet the inner surface of the garment, prior to operation of the pressurising means, but any suitable sequence of events may be employed. Spraying a mixture of air and water is preferred.

Even though only relatively low gas pressures are needed to inflate the garment (0.14-0.21 kg/sq cm) this nevertheless does exert some stretching forces on the garment material and seams, and may of itself create some damage to the garment. To mitigate this problem, a preferred form of the invention includes a substantially inelastic restraint means into which the garment is inserted prior to inflation thereof, and which counteracts stretching of the garment. Usually the restraint means is of the same shape as the garment, but slightly smaller so that the garment adopts substantially its normal non-pressurised non-stretched size after inflation.

For Example, the restraint means might be 90-98% of the linear dimensions of the garment, so as to resist stretching but without leaving folds in the garment material. Different restraint means may thus be required for each size of garment. The restraint means should nevertheless not substantially interfere with the inspection of the inflated garment for leaks. Preferred restraint means include forms of hooped or mesh construction; or transparent material such as perspex. The restraint means can be flexible, such as a mesh bag construction; but for ease of loading, a rigid cage construction, e.g. from metal or rigid plastics, is preferred. The cage may be provided in two or more hinged parts to facilitate loading. Such restraint means also allows testing of garments formed of materials, such as neoprene, which have no natural stop but expand continuously when inflated.

The surface of the closed garment is then checked visually for water leaks. Any leaks are clearly seen either as water droplets or as patches of wetness on the fabric. The leaks can be marked for subsequent repair. Pinholes which only allow through air but not liquid water do not show up in the test so that unnecessary repair work is avoided.

Garments such as suits, socks, mitts, jackets, trousers, overalls, bootees, vests, waders, and suits (including flying suits, survival suits, diving suits, wet suits and dry suits and protective clothing) can be tested.

DETAILED DESCRIPTION OF PREFERRED EMBODIMENTS

Embodiments of the present invention will now be described by way of example only in conjunction with the attached drawings wherein;

FIG. 1 is a schematic sectional view through an inflated overwater flight suit undergoing waterproof integrity testing;

FIG. 6 is a perspective view of a half of a hooped restraint cage for use with the apparatus.

Figure 2:
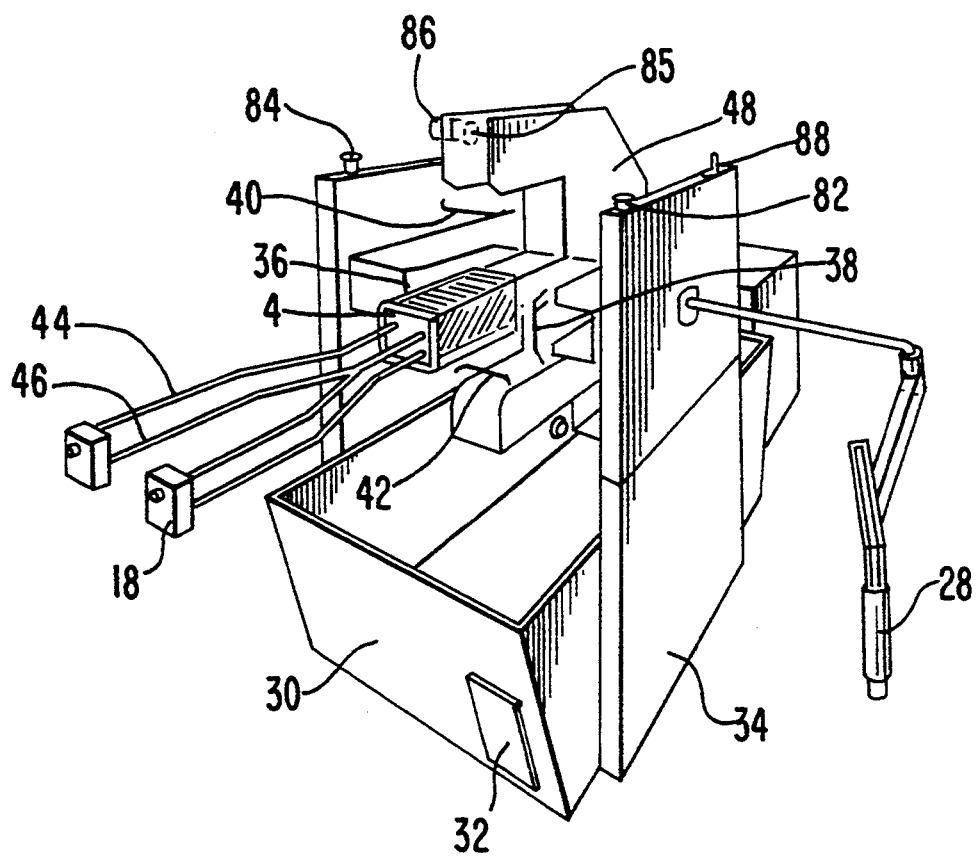
FIG. 2 is a perspective view of a practical apparatus.
Figure 3:
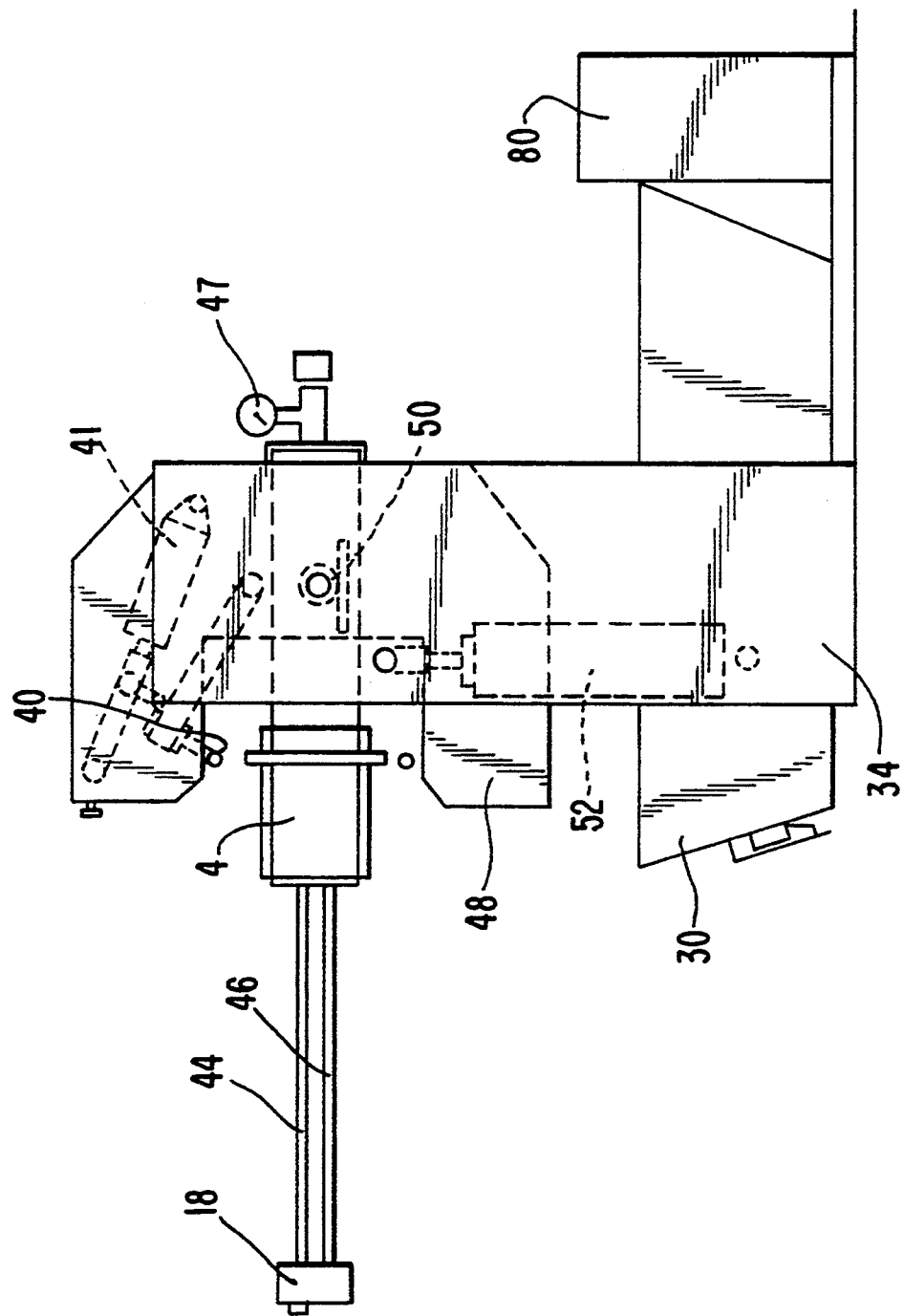
FIG. 3 is a side elevation thereof.

The flight suit 2 is an overwater flight suit having enclosed foot portions, and apertures at the collar and cuffs for head and hands respectively. In the use, a pilot removes his shoes before putting on the flight suit and closing it by means of a waterproof zip up the front. Suitable seals are provided around the collar and cuffs. The breathable fabric is waterproof in the event of accidental immersion in the sea, yet comfortable to wear in normal use.

A support is provided in the form of a plug 4 which fits inside the collar of the flight suit, together with a frame of pipes 6, 8, 10, 12, 14 for introduction of air and water. The pipes include spaced apertures 16 for spraying water onto the inner side of the flight suit. Nozzles 18 are also provided where required in order to spray water into the extremities of the feet and arms of the garment and to ensure satisfactory overall wetting. The pipes lead to a manifold 20 outside the garment having an air inlet 22 and water inlet 24. Prior to inflation, the cuffs of the flight suit are closed by means of clamps 26, 28.

The frame work of the pipes may be provided in three sizes, small medium and large in order to accommodate different size flight suits. In another variation, the centre tube 10 and any of the other tubes may be telescopically formed in order to accommodate different sized and shaped garments.

A typical test procedure is as follows. The overeater flight suit to be tested is first carefully turned inside out and is then hung over the frame work of pipes with the collar around the plug 4. The waterproof zip up the front of the flight suit is then closed so as to tang the flight suit securely from the plug. Clamps are then applied to the cuffs so as to close the garment. A mixture of air and water is then introduced into the flight suit for approximately 10 seconds so as to thoroughly wet the inner surface of the garment and to inflate it to a pressure or 3 lbs per square inch. The water flow may then be stopped and the garment held at 3 lbs per square inch for a period of 2 minutes in order to examine the garment for water leaks. Examination may be visual or in conjunction with wetness testing apparatus (such as a conductivity meter). A fluorescent dye may be included in the water to aid inspection. Typically, around 400 to 800 ml of water is sprayed onto the inside of the flight suit. Any leaks which are detected are marked. The suit is then deflated prior to drying. Any leaks are repaired on the inside of the garment using heat bonding tape. The suit is then turned right way out again.

The method is quick, accurate and employs a minimal amount of water.

FIGS. 2 to 5 show a practical apparatus wherein analogous parts carry the same reference numerals. The apparatus comprises a water trough 30 and drain plate 32, and a support frame 34. Neck loading plug 4 of square section is provided for receiving the neck of the OWFS and four pneumatically operated clamps 36, 38, 40, 42 are arranged around its four sides for clamping the OWFS neck to the plug, via pneumatic cylinders 41 etc.

Two pairs of pipes 44, 46 extend through the plug for delivering compressed air and water to spray nozzles 18. Near the plug, laterally facing nozzles (not shown) are provided for spraying water/air into the OWFS arms. Air pressure is monitored by gauge 47 and maintained at a predetermined value e.g. 0.7–1.5 psi (0.05–0.11 kg/sq cm).

Figure 5:
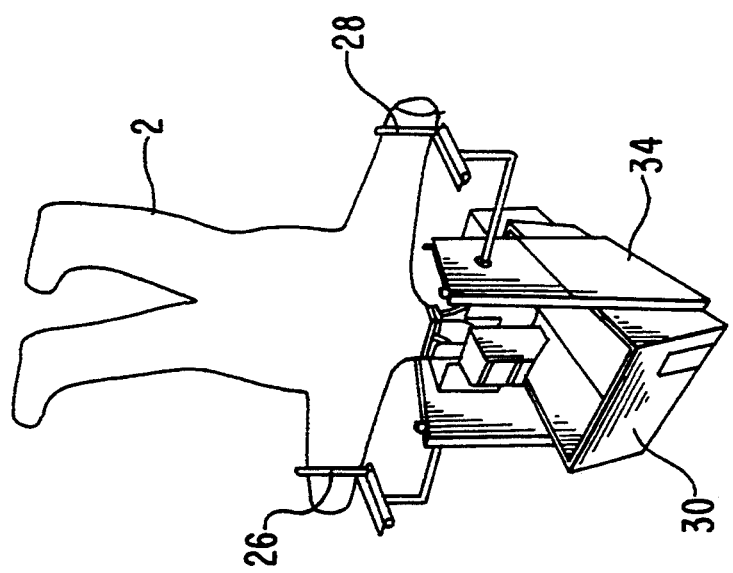
FIG. 5 is a perspective view showing an inflated over-water flight suit raised to an upright position for inspection.
Figure 4:
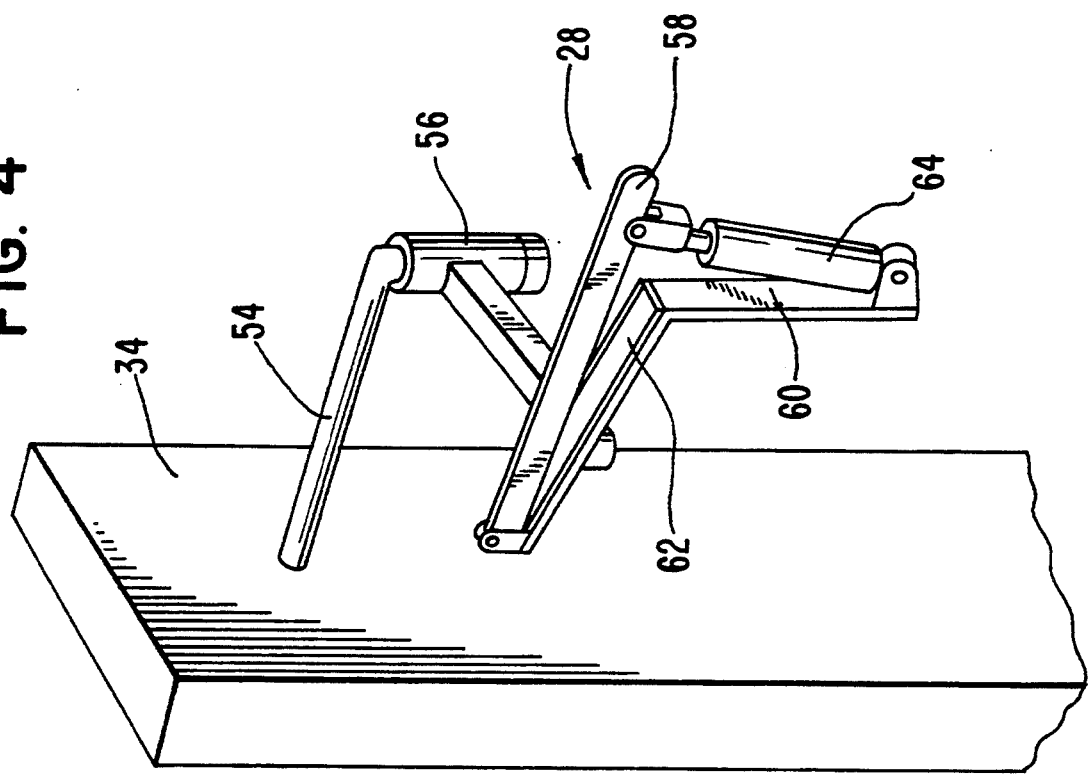
FIG. 4 is a detailed view of a cuff clamp.

The plug and pipe assembly is mounted on a pivoting head 48 which pivots from the horizontal position shown to the upright position illustrated in FIG. 5 for leak inspection, and is mounted on bearings 50. Pivoting is actuated by pneumatic cylinder 52.

A pair of cuff clamps 26, 28 are mounted to the frame via a respective arm 54. A pivoting elbow 56 allows the clamp position to be adjusted. Each clamp comprises a blade 58 and a blade support 60 and rubber cover 62. The clamp blade is pneumatically operated via cylinder 64.

FIG. 6 shows the lower half of a restraint cage 70 into which the OWFS is laid prior to inflation. A corresponding upper half (not shown) is hinged thereto at hinges 71, 72. However, other ways of opening the cage may be used, such as lifting the upper half or hinging along a longitudinal direction.

The cage is formed of strip metal e.g. stainless steel, and comprises an outline brace or frame 74 and hoops 76. The cage is open at the cuffs and at the neck, where a flange 78 is provided for attachment of the cage to the pivoting head 48. The cage is slightly smaller than the OWFS to avoid stretching the OWFS during inflation and testing.

The apparatus is pneumatically operated and is provided with a control box 80. Switches are provided for certain functions. Switch 82 starts the test cycle, switches 84 and 85 stop and reset. Switch 86 closes the neck clamps- Switch 88 tilts the pivoting head. The test procedure is substantially as before, except that the machine cycles automatically. For operator safety the neck and cuff clamps are initially set under low pressure. Initiation of the test cycle locks the clamps under high pressure and sprays air/water mixture into the OWFS. To prevent over-inflation a vent (not shown) allows excess air to vent through the plug 4. For inspection of the other side of the OWFS the pivoting head is raised by the operator at a chosen time via switch 88. Operation of switch 84 allows the cycle to be stopped or reset.

I claim:

1. Apparatus for leak testing a garment for liquid water leaks, which comprises:
   closure members for closing openings in the garment such as to allow the garment to be inflated, which comprises a closure plug for fitting into an opening in the garment and clamps for sealing other openings in the garment;
   at least one pipe passing through the closure plug and terminating in spray nozzles located within the garment for spraying the inner surface of the closed garment with liquid water; and
   at least one pipe passing through the closure plug for pressurizing the closed garment with gas and for forcing sprayed liquid water through any leaks in the closed garment.

2. Apparatus according to claim 1 wherein the garment is a suit and the spray nozzles direct spray into the arms and legs of the suit.

3. Apparatus according to claim 1 which further comprises inelastic restraint means for enclosing the garment and avoiding over-stretching of the garment during inflation; said restraint means having an open or transparent construction for allowing inspection for leaks.

4. Apparatus according to claim 3 wherein the restraint means is a rigid cage.

5. A process for leak testing a garment for liquid water leaks, which comprises:
   closing openings in the garment such as to allow the garment to be inflated;
   simultaneously or sequentially pressurizing and inflating the closed garment by gas pressure, and spraying the inner surface of the closed garment with liquid water; and
   examining the surface of the inflated garment for liquid water forced through any leaks in the garment.

6. A process according to claim 5 wherein the garment is first inflated in a substantially horizontal position and then pivoted to an upright position.

7. A process according to claim 5 which further comprises the step of providing a substantially inelastic restraint means around the garment to prevent over-stretching during inflation.

* * * * *